(12) United States Patent
Renfrow

(10) Patent No.: US 11,052,431 B2
(45) Date of Patent: Jul. 6, 2021

(54) COMPOSITIONS AND METHODS FOR GRAS COMPLIANT CLEANERS FOR ETHANOL PRODUCTION EQUIPMENT

(71) Applicant: Clear Solutions USA, LLC, Gilbert, AZ (US)

(72) Inventor: Lance Renfrow, Gilbert, AZ (US)

(73) Assignee: Clear Solutions USA, LLC, Gilbert, AZ (US)

( * ) Notice: Subject to any disclaimer, the term of this patent is extended or adjusted under 35 U.S.C. 154(b) by 302 days.

(21) Appl. No.: 15/937,732

(22) Filed: Mar. 27, 2018

(65) Prior Publication Data

US 2018/0272388 A1    Sep. 27, 2018

Related U.S. Application Data

(60) Provisional application No. 62/477,361, filed on Mar. 27, 2017.

(51) Int. Cl.
| | |
|---|---|
| C11D 1/66 | (2006.01) |
| B08B 3/08 | (2006.01) |
| C11D 3/22 | (2006.01) |
| C11D 3/04 | (2006.01) |
| B08B 9/08 | (2006.01) |
| C11D 3/00 | (2006.01) |
| C11D 3/20 | (2006.01) |
| C11D 11/00 | (2006.01) |
| C11D 17/00 | (2006.01) |

(52) U.S. Cl.
CPC .................. *B08B 3/08* (2013.01); *B08B 9/08* (2013.01); *C11D 1/662* (2013.01); *C11D 3/0026* (2013.01); *C11D 3/044* (2013.01); *C11D 3/2086* (2013.01); *C11D 3/221* (2013.01); *C11D 11/0023* (2013.01); *C11D 17/0008* (2013.01); *B08B 2209/08* (2013.01); *Y02E 50/30* (2013.01)

(58) Field of Classification Search
CPC .................................... C11D 3/04; B08B 3/08
See application file for complete search history.

(56) References Cited

U.S. PATENT DOCUMENTS

| | | | |
|---|---|---|---|
| 6,194,371 B1 * | 2/2001 | Donovan | C11D 1/825 510/396 |
| 6,537,960 B1 * | 3/2003 | Ruhr | C11D 1/83 510/195 |
| 6,581,613 B2 * | 6/2003 | Berkels | C07H 15/04 134/22.1 |

(Continued)

*Primary Examiner* — Liam J Heincer
*Assistant Examiner* — M. R. Asdjodi
(74) *Attorney, Agent, or Firm* — The Noblitt Group, PLLC

(57) ABSTRACT

The present technology relates to various cleaning compositions and their methods of use in industrial facilities such as ethanol and biofuel producing vessels. Cleaning compositions according to the present technology may be Generally Recognized As Safe (GRAS) as designated by the U.S. Food and Drug Administration (FDA). The cleaning compositions of the present technology may effectively remove biofilm buildup and/or spent grain residue from industrial fermentation vessels and associated apparatus. Various embodiments of the cleaning composition may comprise various surfactants, chelators, acids, bases, and/or defoamers. Some embodiments of the cleaning composition may comprise a gluconate, a glucoside, a strong acid or base, and/or a defoamer.

3 Claims, 2 Drawing Sheets

(56) References Cited

U.S. PATENT DOCUMENTS

Figure 1:
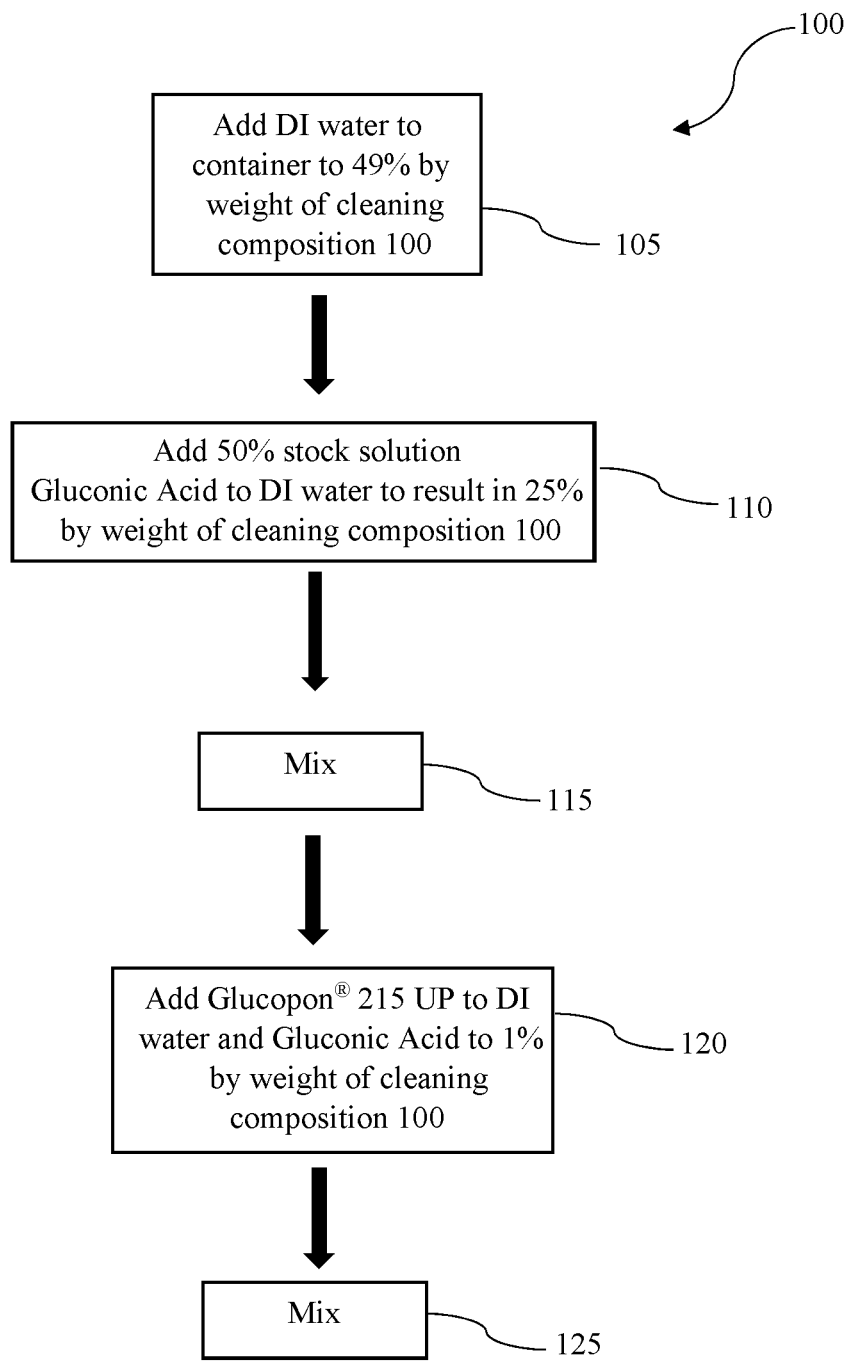

| | | | | |
|---|---|---|---|---|
| 6,936,580 B2* | 8/2005 | Sherry | ............... | A47L 13/20 |
| | | | | 510/383 |
| 7,524,808 B2* | 4/2009 | Futterer | ............ | C11D 3/361 |
| | | | | 510/130 |
| 8,293,699 B2* | 10/2012 | Futterer | ............ | C11D 3/361 |
| | | | | 510/467 |
| 2003/0232736 A1* | 12/2003 | Renfrow | ............ | C11D 1/94 |
| | | | | 510/412 |
| 2006/0199757 A1* | 9/2006 | Renfrow | ............ | C11D 1/94 |
| | | | | 510/499 |
| 2006/0217286 A1* | 9/2006 | Geoffroy | ......... | C11D 11/0023 |
| | | | | 510/490 |
| 2008/0312118 A1* | 12/2008 | Futterer | ........... | C11D 3/3784 |
| | | | | 510/180 |
| 2011/0195889 A1* | 8/2011 | Karagianni | ...... | C11D 3/3769 |
| | | | | 510/360 |
| 2011/0269662 A1* | 11/2011 | Miralles | ........... | C11D 3/0073 |
| | | | | 510/477 |
| 2017/0183606 A1* | 6/2017 | Hodge | ............... | C11D 1/66 |
| 2018/0142189 A1* | 5/2018 | Gerard | ............ | C11D 11/0035 |
| 2018/0272388 A1* | 9/2018 | Renfrow | ......... | C11D 11/0023 |

\* cited by examiner

COMPOSITIONS AND METHODS FOR GRAS COMPLIANT CLEANERS FOR ETHANOL PRODUCTION EQUIPMENT

CROSS-REFERENCES TO RELATED APPLICATIONS

This application claims the benefit of U.S. Provisional Application Ser. No. 62/477,361, filed Mar. 27, 2017, and incorporates the disclosure that application by reference. To the extent that the present disclosure conflicts with the referenced application, however, the present disclosure is to be given priority.

BACKGROUND

Ethanol is produced for a variety of purposes including alcoholic beverages, laboratory applications, as a solvent in the manufacture of various chemicals, and for fuel. Ethanol is manufactured by the fermentation of glucose by yeast or other microbes in a bioreactor. The glucose may come from various agricultural grains such as corn, wheat, and sorghum as well as other sources.

The grain may be steeped in hot water and/or treated with enzymes and heated to hydrolyze starches into glucose. The mashed grains are fermented with yeast in fermentation vessels to produce ethanol. The by-products are called "spent grains" and may also be called "dried grains and solubles". Spent grains are a major by-product of ethanol production. Spent grains are composed of the malt and adjuncts left over after mashing or milling of the grain to obtain fermentable sugars from the grain.

Spent grains from breweries and industrial ethanol production plants are a major source of animal feed. Bioreactors must frequently be cleaned of buildup on its inner walls and other components from residue produced in the fermentation process. Methods of cleaning bioreactors, which typically employ power washing and/or chemical cleaners, must comply with FDA food safety rules and regulations if the spent grain is to be consumed by animals. These regulations require that the equipment, ingredients, and any chemicals that come in contact with the spent grains do not cause contamination of the spent grains with food borne illnesses, making them unsafe for animal consumption and ultimately human consumption.

Conventional cleaning methods in ethanol fermentation vessels (bioreactors) and associated tanks and fluid conduit lines may include hydroblasting, hot water rinse, and/or rinsing with sodium hydroxide solution (NaOH, also called "caustic soda"). Further, the fermentation vessels, tanks, and fluid conduit lines may be periodically treated with an acid wash, such as ethylenediamine tetra-acetic acid, in a destoning procedure at significant cost.

The sodium hydroxide solution may cause a number of problems in the fermentation vessel. For example, the use of caustic soda alone is ineffective and leads to the buildup of calcium carbonate and calcium oxalate in the fermentation vessels, tank, lines, etc. In ethanol production facilities that use sodium hydroxide, if the solution falls below a certain concentration, such as 5% by weight NaOH, the effectiveness of the cleaning can be poor and may take an extended amount of time, causing bacterial infections and lost ethanol yield. Sodium hydroxide solutions that are more concentrated than 5% by weight may cause foaming, which reduces the effectiveness of the solution to clean. Additionally, industrial ethanol production facilities may recycle the sodium hydroxide cleaning solution, which may progressively become less effective at cleaning as exposure to carbon dioxide neutralizes the sodium hydroxide into sodium carbonate.

SUMMARY

The present technology relates to various cleaning compositions and their methods of use in industrial facilities such as ethanol and biofuel producing vessels. Cleaning compositions according to the present technology may be Generally Recognized As Safe (GRAS) as designated by the U.S. Food and Drug Administration (FDA). The cleaning compositions of the present technology may effectively remove biofilm buildup and/or spent grain residue from industrial fermentation vessels and associated apparatus. Various embodiments of the cleaning composition may comprise various surfactants, chelators, acids, bases, and/or defoamers. Some embodiments of the cleaning composition may comprise a gluconate, a polyglucoside, a strong acid or base, and/or a defoamer.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence or scale. For example, steps that may be performed concurrently or in different order are illustrated in the figures help to improve understanding of embodiments of the present technology.

Figure 2:
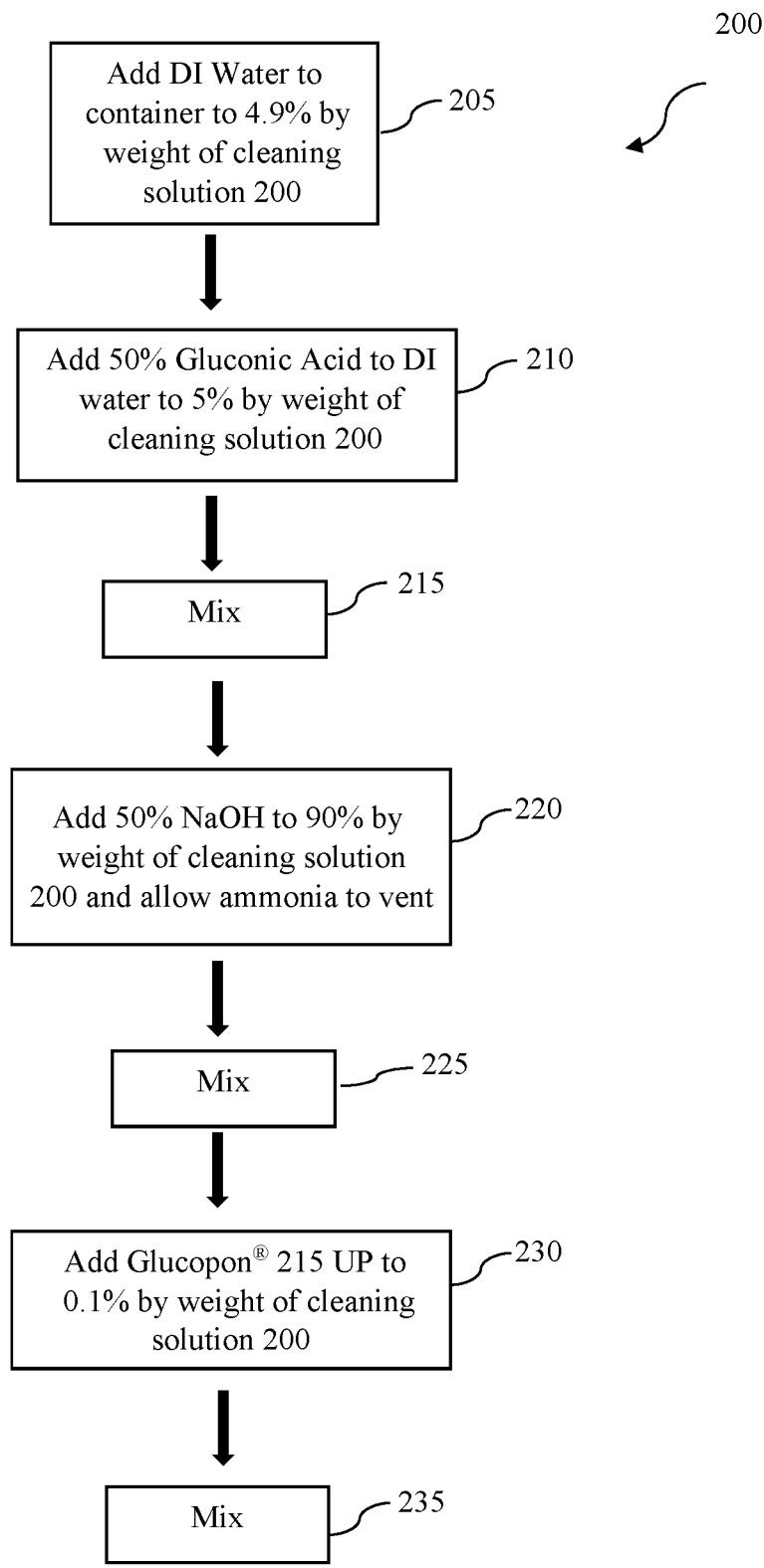

The figures described are for illustration purposes only and are not intended to limit the scope of the present disclosure in any way. Various aspects of the present technology may be more fully understood from the detailed description and the accompanying drawing figures, wherein:

FIG. 1 is a flow chart for the preparation of an exemplary cleaning composition; and FIG. 2 is a flow chart for the preparation of an exemplary cleaning composition mixed with sodium hydroxide.

DETAILED DESCRIPTION OF EXEMPLARY EMBODIMENTS

The present technology may be described herein in terms of functional block components and various processing steps. Such functional blocks may be realized by any number of components configured to perform the specified functions and achieve the various results. For example, the present technology may employ various surfactants, acids, bases, defoamers, storage facilities, and the like, which may carry out a variety of functions. In addition, the present technology may be practiced in conjunction with any number of devices used to mix components and/or apparatus to apply the components to a fermentation system.

The present technology relates to various cleaning compositions and their methods of use in interior components of various industrial vessels. The vessels may be any industrial ethanol production facilities such as for producing biofuels, dairy production facilities, and any other vessels that require cleaning with compositions that are Generally Recognized as Safe (GRAS) under the U.S. Food and Drug Administration (FDA) rules due to their use for producing human and animal food products. The GRAS designation of the cleaning composition indicates that it is a chemical or substance added to food that is considered safe for its intended use according to expert opinion. The GRAS designation provides an exemption from the Federal Food, Drug, and Cosmetic Act (FFDCA) food additive tolerance requirements.

The cleaning composition of the present technology may be used in any interior component of the vessel to remove residue and biofilms that build up inside the interior components during use of the vessel. For example, the interior components may be the interior walls of ethanol fermentation bioreactors, grain grinders, and distillation vessels as well as associated pumps, fluid lines, tubes, and pipes. Similarly, the interior components may be the interior walls of various dairy processing vessels, such as dairy holding tanks and pasteurization vats and associated tubes through which milk is pumped.

The cleaning compositions of the present technology may effectively remove residue from biofilm buildup and/or spent grain residue from the interior components of the vessels. Bacterial infections and build-up from calcium carbonate, calcium oxalate, and iron in vessels due to poor cleaning causes reductions in ethanol yield and consequent financial losses.

The cleaning composition according to various aspects of the present technology may comprise a gluconate, a glucoside, distilled (DI) water, a strong acid or base, and/or a defoamer. In various aspects, the gluconate and polyglucoside of the cleaning composition may reduce the surface tension of the strong acid or strong base, such as sodium hydroxide, causing the cleaning composition to more effectively penetrate and dislodge biofilms and residues it encounters in the interior components of vessels to aid in their removal. The cleaning composition may be low foaming, reducing or preventing the need to add extraneous defoaming solutions and additional rinse steps.

Various embodiments of the cleaning solution may utilize a strong acid or base. For example, the cleaning solution may comprise sodium hydroxide and/or, potassium hydroxide. In some embodiments, the cleaning solution may comprise phosphoric acid. Sodium hydroxide has been GRAS approved under CAS Reg. No. 1310-73-2. In some embodiments, a stock solution of 50% by weight of sodium hydroxide, diaphragm or membrane grade, may be used in the cleaning solution.

Various embodiments of the cleaning composition may comprise the surfactant gluconate. The gluconate may comprise a salt of gluconic acid such as sodium gluconate. Various exemplary stock formulations of the sodium gluconate may be a dry powder or a solution of 60% or 70% by weight sodium gluconate. In some embodiments, the gluconate may be gluconic acid, such as a 50% by weight solution of gluconic acid. Gluconic acid is an organic compound of the molecular formula $C_6H_{12}O_7$ and the structural formula $HOCH_2(CHOH)_4COOH$ and may act as a chelant and/or dispersant. Sodium gluconate is GRAS certified under 21 C.F.R. § 182.6757. In some embodiments, the cleaning composition may comprise approximately 4% to approximately a 6% by weight of gluconic acid. In some embodiments, the cleaning composition may comprise up to approximately 5% by weight gluconic acid. In one embodiment, the cleaning composition may comprise approximately 5% by weight gluconic acid. Higher concentrations of the gluconic acid may be needed when used with water with a high hardness, such as over 25 grains per gallon (gpg).

Various embodiments of the present technology may also utilize a polyglucoside. In some embodiments, the polyglucoside may increase solubility of components of the gluconic acid, increasing its potency as a cleaner. In some embodiments, the polyglucoside may act as a surfactant to reduce surface tension of the caustic soda so less caustic soda and/or cleaning solution needs to be used to clean the same surface area.

In one embodiment, the glucoside may comprise caprylyl glucoside and/or decyl glucoside. For example, in one embodiment the glucoside may comprise a mixture of caprylyl glucoside and decyl glucoside provided in the product Glucopon® 215 UP (BASF Home Care and Industrial Ingredients). Glucopon® 215 UP has been concluded to be GRAS for the application of cleaning vegetables, poultry, etc. In some embodiments, the polyglucoside may exhibit the tendency to foam. In various embodiments, the cleaning composition may comprise up to approximately 0.5% to approximately 2% by weight Glucopon® 215 UP. For example, in some embodiments, the cleaning composition may comprise up to approximately 1% by weight Glucopon® 215 UP.

In some embodiments, the cleaning composition may further comprise or be used in conjunction with a defoamer. The defoamer may be used to reduce foaming of the polyglucoside inside the interior components of the vessel. For example, the cleaning composition may be added to the interior components of the vessel for cleaning, followed by the addition of the defoamer to the vessel separately from the cleaning composition. In some embodiments, the defoamer may be added to the cleaning composition prior to the application of the cleaning composition to the vessel. Some defoamers may be hydrophobic and unstable when added to the cleaning composition, necessitating the separate use of the defoamer in the vessel. In various embodiments, the defoamer may comprise any suitable GRAS designated chemical that prevents foaming or impedes its formation. In various embodiments, the defoamer may comprise silica, dimethyl silicone polymer, and/or white mineral oil. For example, in one embodiment, the defoamer may comprise Tramfloc® 1174 (Tramfloc, Inc., Spring, Tex.). In various embodiments, the defoamer may be added to the cleaning composition in a ratio of approximately one part defoamer for every approximately 10,000 parts complete solution.

Referring to FIG. 1, a method of preparing the cleaning composition 100 may comprise adding distilled (DI) water to a container to approximately 49% by weight of the cleaning composition 100 (105), then adding a stock solution of approximately 50% gluconic acid to the DI water to approximately 50% by weight of the cleaning composition 100 (110 and 115). The Glucopon 215 UP (polyglucoside) may then be added to the gluconic acid and DI water mixture to approximately 1% by weight of the cleaning composition 100 (120 and 125). For example, in some embodiments, the cleaning composition 100 may be prepared according to the formula:

TABLE 1

| Cleaning Composition 100 | |
| --- | --- |
| Component | % by weight |
| DI Water | 49 |
| Gluconic Acid 50% | 50 |
| Glucopon 215 UP | 1 |
| Total | 100 |

The cleaning composition 100 may be beneficially prepared for transport to the industrial facility, such as an ethanol plant, since due to its low propensity to foam while being disturbed as it is transported. Once the cleaning composition 100 arrives at the industrial facility, it may be mixed with the sodium hydroxide, such as a stock solution of 50% NaOH, to form the usable cleaning composition. In another embodiment, the sodium hydroxide may be added to the cleaning composition 100 prior to transportation to the industrial facility.

Referring to FIG. 2, in some embodiments, a cleaning composition 200 (which constitutes the useable cleaning composition) may be prepared by adding DI water to a container to approximately 4.9% by weight of the cleaning composition 200 (205), then adding a solution of 50% gluconic acid to the DI water to approximately 5% by weight of the cleaning composition 200 (210 and 215). The sodium hydroxide, such as using a stock solution of 50% sodium hydroxide, may be added to the gluconic acid and DI water mixture to approximately 90% by weight of the cleaning composition 200 (220 and 225). Ammonia may vent from the mixture. The Glucopon® 215 UP (polyglucoside) may then be added to the gluconic acid, DI water, and sodium hydroxide mixture to approximately 0.1% by weight of the cleaning composition 200 (230 and 235). For example, the cleaning composition 200 may be prepared according to the formula:

TABLE 2

Cleaning Composition 200

| Component | % by weight |
| --- | --- |
| DI Water | 4.9 |
| Gluconic Acid (50% stock) | 5 |
| Glucopon 215 UP | 0.1 |
| Sodium Hydroxide (50% stock) | 90 |
| Total | 100 |

Various embodiments of the cleaning composition exhibit various surface tensions. Surface tension is a measurement of the attraction of the surface of a liquid to another surface. Surfactants, such as gluconic acid, lower the surface tension of the cleaning composition to allow it to spread and penetrate into the biofilms and residues in the interior components of the vessel, breaking them down, and creating an emulsion to wash them away. The lower the surface tension, the more the cleaning solution will penetrate the contaminants in the vessel.

The surface tension of various dilutions of the cleaning composition were measured using a Wilhelmy plate method on a Krus K100 processor Tensiometer:

TABLE 3

Surface Tension Measurements

| % by weight cleaning composition | % by weight Glucopon 215 UP | Average Surface Tension of 2 Replicates (nM/m) |
| --- | --- | --- |
| 2 | 5 | 29.96 |
| 2 | 10 | 28.32 |
| 2 | 20 | 28.25 |
| 1 | 5 | 30.81 |
| 1 | 10 | 29.95 |
| 1 | 20 | 28.48 |
| 0.5 | 5 | 37.91 |
| 0.5 | 10 | 34.90 |
| 0.5 | 20 | 29.73 |

The surface tension of cleaning compositions comprising 45% distilled water, 25% by weight gluconic acid, and one of 5%, 10%, and 20% by weight of the polyglucoside, Glucopon 215 UP, was measured. Each of the cleaning compositions was diluted to 2%, 1%, and 0.5% by weight in distilled water. The surface tension data demonstrated that use of approximately 10% Glucopon 215 UP in the cleaning composition without sodium hydroxide, which translates to approximately 1% Glucopon 215 UP in the cleaning composition with sodium hydroxide, provides a beneficially low surface tension.

In the foregoing description, the technology has been described with reference to specific exemplary embodiments. Various modifications and changes may be made, however, without departing from the scope of the present technology as set forth. The description is to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. A cleaning composition for mixing with a strong base, the composition consisting of:
    water;
    gluconic acid in a range of 20% to 30% by weight of the cleaning composition; and
    a polyglucoside in a range of 0.5% to 2% by weight of the cleaning composition.

2. The cleaning composition of claim 1, wherein the polyglucoside is at least one of caprylyl glucoside and decyl glucoside.

3. The cleaning composition of claim 1, wherein the strong base is sodium hydroxide.

\* \* \* \* \*